(12) United States Patent
Sieben

(10) Patent No.: US 10,399,682 B2
(45) Date of Patent: Sep. 3, 2019

(54) ARRANGEMENT IN A VEHICLE CABIN WITH FOLDING SEAT PROTECTED FROM IMPACTS

(71) Applicant: Airbus Operations GmbH, Hamburg (DE)

(72) Inventor: Martin Sieben, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/677,948

(22) Filed: Aug. 15, 2017

(65) Prior Publication Data

US 2018/0016016 A1 Jan. 18, 2018

Related U.S. Application Data

(63) Continuation of application No. PCT/EP2016/053034, filed on Feb. 12, 2016.

(30) Foreign Application Priority Data

Feb. 18, 2015 (DE) .................. 10 2015 102 314

(51) Int. Cl.
*B64D 11/06* (2006.01)
*B64D 11/02* (2006.01)
*B64D 11/04* (2006.01)

(52) U.S. Cl.
CPC .......... *B64D 11/0691* (2014.12); *B64D 11/02* (2013.01); *B64D 11/04* (2013.01)

(58) Field of Classification Search
CPC ..... B64D 11/0691; B64D 11/02; B64D 11/04; B64D 2011/0046; A47K 4/00; E03C 1/01
See application file for complete search history.

(56) References Cited

U.S. PATENT DOCUMENTS 4,799,632 A * 1/1989 Baymak ............. B64D 11/0691
244/122 R
4,993,666 A * 2/1991 Baymak .................. B09B 1/00
244/122 R
(Continued)

FOREIGN PATENT DOCUMENTS

DE 102011016031 A 10/2012
DE 102012023045 A1 8/2016
(Continued)

OTHER PUBLICATIONS

International Searching Authority, International Search Report for International Application No. PCT/EP2016/053034 dated May 9, 2016.

*Primary Examiner* — Medhat Badawi
(74) *Attorney, Agent, or Firm* — Lorenz & Kopf LLP

(57) ABSTRACT

An arrangement in a cabin of a vehicle includes at least one cabin monument having a first wall and at least one second wall, at least one folding seat with an installation width occupied due to a back side of the folding seat and an installation depth occupied due to a lateral surface of the seat frame of the folding seat, and a delimiting device. At least one of the at least one second walls is arranged at an angle of at least 45° relative to the first wall. At least one of the at least one second walls extends from the first wall at least about the installation depth along der lateral surface of the folding seat. The delimiting device is arranged substantially parallel to the first wall on a side of the second wall farthest from the first wall.

10 Claims, 3 Drawing Sheets

(56) References Cited

U.S. PATENT DOCUMENTS

| | | | | |
|---|---|---|---|---|
| 5,335,963 A * | 8/1994 | Muller | B60N 2/3047 | 297/14 |
| 5,383,629 A * | 1/1995 | Morgan | B64D 11/00 | 244/118.6 |
| 6,000,659 A * | 12/1999 | Brauer | B64D 11/00 | 244/118.5 |
| 6,460,922 B1 * | 10/2002 | Demick | B60N 2/3034 | 296/65.11 |
| 6,669,141 B2 * | 12/2003 | Schmidt-Schaeffer | B60N 2/01 | 244/118.6 |
| 6,846,044 B2 * | 1/2005 | Moffa | B60N 2/3043 | 297/14 |
| 7,399,031 B2 * | 7/2008 | Gardner | B60P 3/39 | 297/1 |
| 7,966,952 B2 * | 6/2011 | Fissette | B64D 11/0007 | 108/115 |
| 8,118,365 B2 * | 2/2012 | Henshaw | B60N 2/242 | 297/245 |
| 8,215,695 B2 * | 7/2012 | Ida | B60N 2/01583 | 296/65.03 |
| 8,672,267 B2 * | 3/2014 | Schliwa | B64D 11/02 | 244/118.6 |
| 8,746,315 B2 * | 6/2014 | Barlag | B29C 70/541 | 156/560 |
| 8,770,659 B2 * | 7/2014 | Isherwood | B64D 11/0691 | 297/14 |
| 9,346,548 B2 * | 5/2016 | Schliwa | B64D 11/02 | |
| 9,376,211 B2 * | 6/2016 | Schliwa | B64D 11/02 | |
| 9,382,005 B2 * | 7/2016 | Schliwa | B64D 11/00 | |
| 9,656,751 B2 * | 5/2017 | Schliwa | B64D 11/02 | |
| 9,802,706 B2 * | 10/2017 | Schliwa | B64D 11/0691 | |
| 10,093,421 B2 * | 10/2018 | Savian | B64D 11/02 | |
| 2002/0062521 A1 * | 5/2002 | Itakura | B64D 11/02 | 4/664 |
| 2004/0163170 A1 * | 8/2004 | Cooper | B64D 11/02 | 4/664 |
| 2009/0206200 A1 * | 8/2009 | Bolder | B64D 25/16 | 244/118.5 |
| 2010/0059625 A1 * | 3/2010 | Saint-Jalmes | B64C 1/1469 | 244/118.6 |
| 2012/0199695 A1 | 8/2012 | Isherwood et al. | | |
| 2013/0001359 A1 * | 1/2013 | Schliwa | B64D 11/02 | 244/118.6 |
| 2013/0126672 A1 * | 5/2013 | Weitzel | B64D 11/06 | 244/118.6 |
| 2013/0313365 A1 * | 11/2013 | Ehlers | B64D 11/06 | 244/118.6 |
| 2013/0334369 A1 * | 12/2013 | Schliwa | B64D 11/02 | 244/118.5 |
| 2014/0027572 A1 * | 1/2014 | Ehlers | B64D 11/06 | 244/118.6 |
| 2014/0138483 A1 * | 5/2014 | Schliwa | B64D 11/02 | 244/118.5 |
| 2014/0166808 A1 * | 6/2014 | Boenning | B64D 11/06 | 244/118.6 |
| 2014/0209741 A1 * | 7/2014 | Boenning | B64D 11/06 | 244/118.6 |
| 2014/0312173 A1 * | 10/2014 | Ehlers | B64D 11/06 | 244/118.6 |
| 2014/0326829 A1 * | 11/2014 | Ehlers | B64D 11/0691 | 244/118.6 |
| 2015/0284097 A1 * | 10/2015 | Schliwa | B64D 11/0691 | 244/118.6 |
| 2016/0144962 A1 * | 5/2016 | Schliwa | B64D 11/02 | 244/118.5 |
| 2017/0320581 A1 * | 11/2017 | McIntosh | B64D 11/0691 | |
| 2017/0341753 A1 * | 11/2017 | Gonnsen | B64D 11/0691 | |
| 2018/0016016 A1 * | 1/2018 | Sieben | B64D 11/02 | |

FOREIGN PATENT DOCUMENTS

| | | |
|---|---|---|
| WO | 2012110643 A1 | 8/2012 |
| WO | 2016131722 A1 | 8/2016 |

* cited by examiner

ARRANGEMENT IN A VEHICLE CABIN WITH FOLDING SEAT PROTECTED FROM IMPACTS

CROSS-REFERENCE TO RELATED APPLICATION(S)

This application is a continuation of international patent application number PCT/EP2016/053034, having an international filing date of Feb. 12, 2016, which claims priority to German patent application number 10 2015 102 314.8, having a filing date of Feb. 18, 2015. Both of these referenced applications are incorporated by reference herein.

TECHNICAL FIELD

Embodiments of the invention relate to an arrangement in the cabin of a vehicle, particularly an aircraft, and a vehicle, particularly an aircraft, with a cabin constructed therein that includes at least one such arrangement.

BACKGROUND

Cabins in vehicles, and particularly in aircraft, are designed according to specific criteria, and besides a desired number of passenger seats they also include fittings that serve to enhance comfort in the cabin or raise awareness of safety-critical functions. These may include toilets, galley modules and the like, and may also relate to seats that are designed to be folded away, for use by the cabin crew. Particularly when designing passenger cabins for an aircraft, it is important to create a product that is lightweight yet fulfils many functions, in order to optimize the efficiency of the aircraft. This requires that the fittings be arranged in a highly space saving manner, which may also include creating multifunctional fittings. One possible objective may be considered to be the provision of as many functions for ensuring the comfort or safety of all passengers as possible within the smallest possible space inside the passenger cabin.

Particularly for the purpose of certifying airliners, it is obligatory to provide a cabin crew seat for every member of the cabin crew so that everyone is able to assume a safe position during take-off and landing, but this occupies yet more room in a cabin where space is already at a premium. It is known to mount folding seats on various fixtures for the cabin crew, and to pivot these into a position suitable for seating when they are needed, taking into account that access to other facilities will be blocked while such seats are in use. For example, from German patent document DE 10 2011 016 031 A1 it is known to mount a cabin crew seat on an aircraft galley bulkhead, and attach it so that it is able to pivot.

When designing compact functions in an aircraft passenger cabin, the space available for the associated fittings may be relatively small, which undoubtedly increases awareness of passages and the like, but when they are used heavily by large numbers of people, the edges and corners of adjacent fitting objects may be subjected to frequent bumping by people or objects such as cabin trolleys or items of passengers' luggage. If a cabin crew seat is located on such an edge or corner, it may suffer from quite frequent impacts.

BRIEF SUMMARY

Accordingly, an object of this disclosure is to suggest an arrangement in a cabin of a vehicle, in which particularly folding seats in compact monument arrangements are protected from being knocked inadvertently, but without impairing the compact organization inside the cabin.

Disclosed herein is an arrangement having the features of independent claim 1, which addresses the above objective. Advantageous embodiments and refinements thereof are described in the dependent claims and the following description.

An arrangement in a vehicle cabin is suggested, having at least one cabin monument with a first wall and at least one second wall, at least one folding seat mounted on the first wall, which seat has an installation width occupied by a back side of the folding seat in an unused position and an installation depth occupied by a lateral surface of the folding seat in an unused position, and a delimiting apparatus. At least one of the at least one second walls is arranged at an angle of at least 45° to the first wall. At least one of the at least one second walls extends around at least the installation depth of the seat frame of the folding seat along the lateral surface of the folding seat. The delimiting apparatus is arranged on a side of the second wall farthest from the first wall, and separates the extension of the second wall from the first wall.

The term cabin monument is understood to mean a structure that particularly has a housing that encloses a useful space, in which at least one dedicated general function for the passenger cabin is provided. The monument usually stands on a cabin floor, where it is anchored in a desired position, and it extends from there toward the cabin ceiling. Some monuments may indeed reach as far as the ceiling but others are not so tall. For example, the at least one cabin monument may be a galley monument, a toilet monument, a washroom, a changing room, a sleeping compartment, a stowage compartment or any combination of two or three or more of such monuments in a multifunctional, module-based assembly. As should be evident from the expression "at least one", of course the arrangement according to the invention may also include multiple cabin monuments.

The folding seat, which is particularly constructed to serve as a cabin crew seat, has a seating surface that is supported so as to be pivotable, and can be pivoted into a usable position or a stowed position by pivoting. In the stowed position, the folding seat is overall very flat and compact, so that it takes up very little space. This feature makes it possible for the folding seat to be installed particularly in a passageway or work area, which only has to be unobstructed when the folding seat is not needed. The seating surface is arranged so as to be pivotable on a seat frame, wherein the seat frame is furnished with fastening means, which are arranged to match corresponding fastening means on the first wall. The fastening means may have the form of drill holes or threaded sleeves. An installation depth of the seat frame may be equal to the installation depth of the entire folding seat. On the other hand, however, the seating surface in an unused position can still increase the installation depth of the folding seat as well, if the seating surface protrudes out above the seat frame.

The delimiting device may be present in the form of various apparatuses that allow a spatial separation of the extent of the second wall. In the following description, several different delimiting devices will be described, which may have the form of a wall or the termination of a second wall.

The folding seat is arranged in accordance with the features represented in the preceding text in such manner that a lateral surface of the folding seat is arranged in a corner or step, or a shoulder that is formed by the spatial arrangement of the second wall relative to the first wall discussed earlier. The second wall extends from the first wall by at least the installation depth of the seat frame, so that the lateral surface and the edge of the folding seat frame associated with the lateral surface are shielded from inadvertent impacts by the second wall. Consequently, when passing this edge of the folding seat, it is all but impossible for anything or anyone to bump against the folding seat. If it is facing a passageway or work area, the second wall can guided the path chosen by a person intuitively, in such manner that the person's path passes straight by the folding seat and, if the corresponding passage width is too narrow due to the presence of other individuals, it can prevent the corresponding edge from being struck.

The arrangement of the second wall relative to the first wall may be chosen as a right angle to simplify manufacture of the components involved. However, many other angles between the first and second walls are possible, and would still result in the desired shielding effect for the folding seat behind the second wall. The angle between the first and second walls, measured at a straight edge of the extension planes of the first and second walls should be at least 45°, so that the requisite distance between the second wall and the shielding lateral surface of the folding seat may be chosen as small as possible, and the spatial extension of the second wall is limited in a reasonable, spatially efficient manner, particularly if it forms part of a different monument than the first wall. At the same time, and for the same reasons, it would be advisable to limit the angle between the first wall and the second wall to a value of about 135°, so that the second wall does not approach a parallel to the first wall too closely, and consequently lead a person toward the lateral surface of the folding seat.

In all, the first wall, the second wall and the delimiting device combine in an overlapping arrangement to form a mechanically very simple way to protect a folding seat or vehicle crew jump seat in the folded position from damage extremely effectively, without sacrificing any of its compact qualities or substantially altering the construction of the folding seat.

In an advantageous embodiment, the first wall and the second wall are arranged perpendicularly to one another. The first and second wall thus form a right-angled shoulder or step against which a lateral surface of the folding seat can lie flush particularly advantageously, thereby improving the shielding effect therefor. Particularly if two adjacent cabin monuments are used or if the shoulder is arranged on two adjacent modules within a single, larger cabin monument, the right-angled arrangement can make it possible for the shoulder to be formed simply by an offset arrangement of the modules or the adjacent cabin monuments, if the cabin monuments or adjacent modules have their own wall.

In an equally advantageous embodiment, the first wall is arranged on a first monument and the second wall is arranged on a second monument adjacent to the first monument. In this way, an overlap is provided between two cabin monuments in a direction of extension that is preferably parallel to the direction of extension of the folding seat's installation depth. It is preferable that a gap is not formed between the two cabin monuments, but rather they both lie entirely flush with one another. It may prove particularly advantageous to use monuments of two different kinds, of which for example one monument affords a first function and another monument provides a second function. In particular, the monument having the second wall may be configures to provide storage space or the like, and offers a greater installation depth for this purpose. If the arrangement is positioned in free standing manner in a cabin, two monuments having the same depth might be offset relative to one another, so that a shoulder is formed on two sides of such an arrangement, in which two folding seats may be arranged.

It is further conceivable to create the first wall and the second wall from a recess in a housing wall of a monument. The recess may be constructed along an extension of the second wall in such manner that the recess is delimited on both sides by the second wall. Otherwise, the recess may also be arranged in such manner that it is delimited by one second wall, but simply ends on the other side of the folding seat.

The delimiting device may extend essentially parallel to the first wall. In a further advantageous embodiment, the delimiting device may have the form of a third wall, for example, which extends parallel to the first wall. The third wall thus forms a harmonious closure beside a folding seat arranged on a shoulder.

In addition, the at least one of the at least one second wall may extend from the first wall around the entire installation depth of the folding seat in the unused position along the lateral surface of the folding seat. As a consequence, not only the seat frame of the folding seat, but also the preferably somewhat softer seating surface is protected from any impacts, if the space conditions in the cabin allow of such an arrangement.

In an embodiment that differs from this, the at least one of the at least one second walls may extend from the first wall even around the entire installation depth and a further distance from 2 to 20 cm of the folding seat in the unused position along the lateral surface of the folding seat, and may protrude beyond this. This is to be viewed as additional protection against mechanical impairment of the folding seat.

In addition, two folding seats may also be arranged on the first wall, which is particularly useful in larger cabins, in order to provide two members of the flight crew in an aircraft with the requisite seating possibility.

The first monument may have a storage space for storing a trolley on a side of the first wall farthest from the at least one folding seat. In this case, the first monument would possibly be a galley monument, which is often used as a basis for stowing a seat for the cabin crew.

Finally, one of the at least one second walls may be arranged on the second monument, and the first monument may have a second wall on the side thereof farthest from the second monument, the outside of which is adjoined by a deflector, which extends as a substantially flat component from the second wall to an outer side of the first monument farthest from the second monument and forms an angle smaller than 90° with the second wall arranged on the first monument.

An embodiment of the invention further relates to a vehicle having a cabin and at least one arrangement positioned therein that has the features described in the preceding text.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and application options of the disclosed subject matter will be evident from the following description of embodiments and the figures. Identical or similar objects are also designated by the same reference signs in all of the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
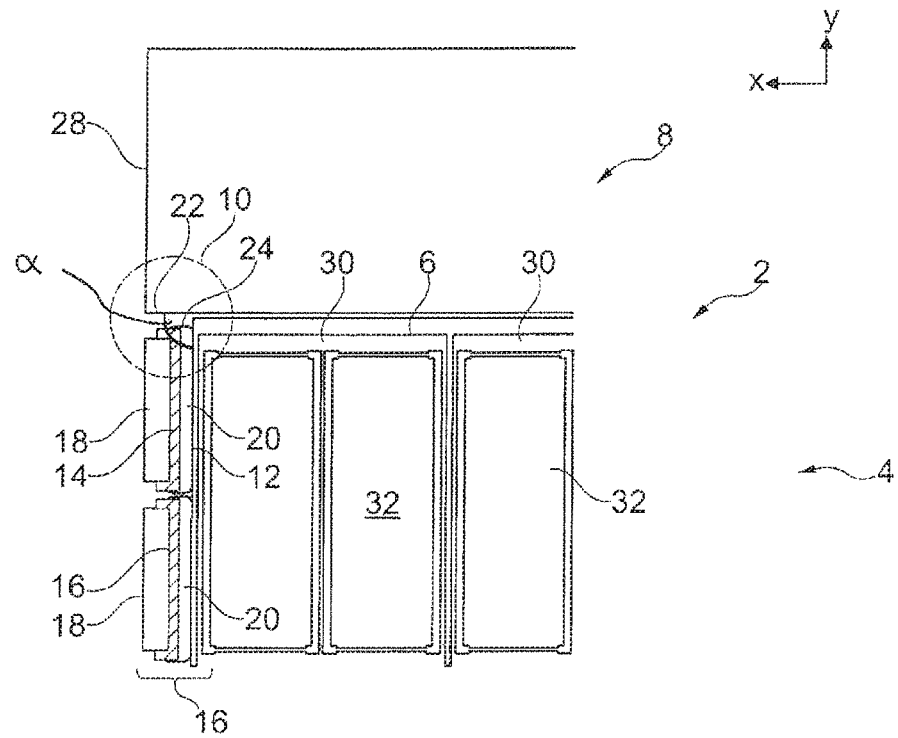
FIGS. 1 to 7 each show diagrammatic representations of an arrangement in plan view.

FIG. 1 shows an arrangement 2 in a cabin 4 of a vehicle. Arrangement 2 includes a first cabin monument 6 and a second cabin monument 8, which are arranged next to each other and overlap each other in a direction x in an overlap area 10. Two folding seats 14 and 16 are arranged against a first wall 12 of the first cabin monument 6, and these are shown in an unused position in FIG. 1. Both folding seats 14 and 16 have a seating surface 18, which is arranged pivotably on a seat frame 20, which frame is in turn connected to first wall 12.

A particular feature of arrangement 2 is that a second wall 22 of the second cabin monument extends from first wall 12 through an angle α of at least 45°, but preferably of 90° for manufacturing reasons, along a lateral surface 24 of the folding seat 14 about a distance in the x-direction, substantially corresponding to an installation depth 26 of the seat frame 20 of folding seats 14 and 16. Consequently, first cabin monument 6 and second cabin monument 8 overlap in overlap area 10 in such manner that at least first folding seat 14 lies very close to a step formed thereby, and is protected from inadvertent impacts due to a third wall 28 which is arranged as a delimiting element, substantially parallel to first wall 12, and which moves away from folding seats 14 and 16 in a y-direction.

If third wall 28 and folding seats 14 and 16 face towards a passage area, for example, a person who is currently in this passage area may be guided past folding seats 14 and 16. Folding seats 14 and 16, and particularly seat frame 20 are very well shielded from inadvertent knocks in this way, so that damage to folding seats 14 and 16 can essentially be prevented entirely.

The functions afforded by first cabin monument 6 and second cabin monument 8 are of practically any conceivable nature. For exemplary purposes only, cabin monument 6 is represented as part of a galley monument, and is equipped with stowage spaces 30, which are configured to accommodate cabin trolleys 32.

Figure 2:
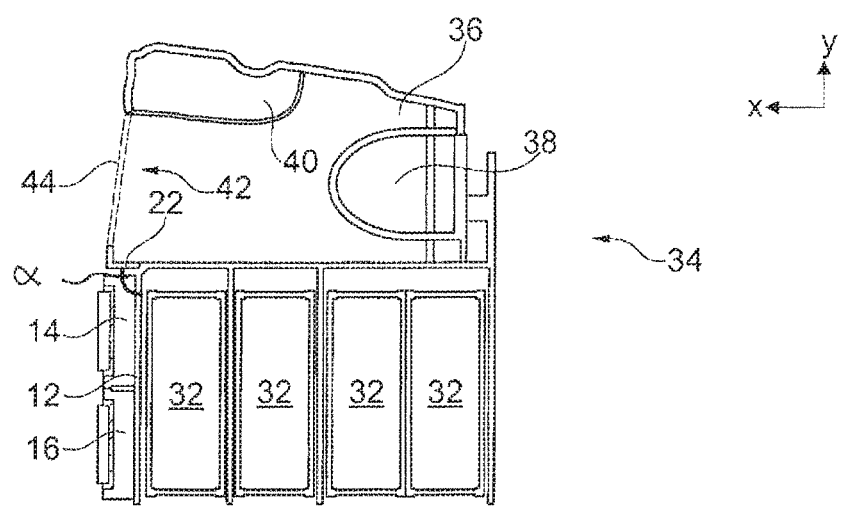

In FIG. 2, an arrangement 34 is represented in which arrangement 2 has been modified in such manner that a second cabin monument 36 is a toilet module with a toilet 38, a washbasin 40 and an entry opening 42 located therein, which opening is located in a third wall 44. The extension of the second wall 22 that forms an angle α with first wall 12 is delimited in the x-direction by the third wall 44, wherein the third wall 44 is slightly inclined. As a result, it is not necessary for third wall 44 or 28 to be aligned parallel to first wall 12, even with an angled arrangement of the third wall 44 relative to first wall 12 it is possible to achieve optimal shielding of one or more folding seats 14.

Figure 3:
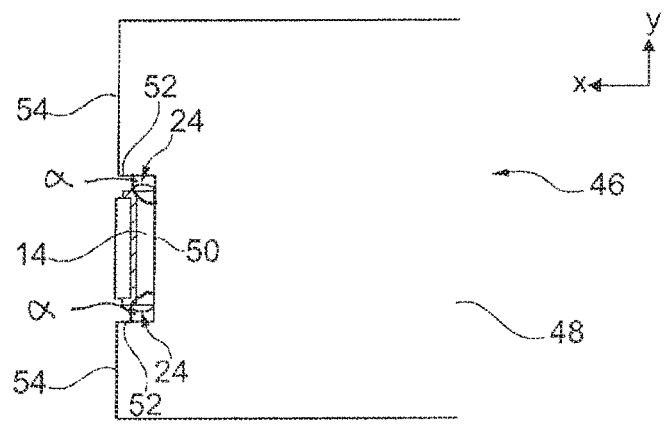

FIG. 3 shows a further arrangement 46 with a single cabin monument 48, which has a first wall 50 on one side, to which a single folding seat 14 is secured, and along each of the lateral surfaces 24 of which a second wall 52 extends about an a to the extension plane of first wall 50, which is then delimited in each case by one third wall 54 as the delimiting element. For exemplary purposes, third wall 54 extends parallel to first wall 50. Consequently, folding seat 14 lies in a recess or depression in a single monument 48, lateral surfaces 24 are completely shielded by the depression.

The width of the depression, i.e., of first wall 50, is determined on the basis of the fastening effort. If the seat 14 has to be accessed from a side determined by the lateral surface 24, first wall 50 should be a hand width wider than the width of folding seat 14, for example, with due consideration for ergonomic principles.

Figure 4:
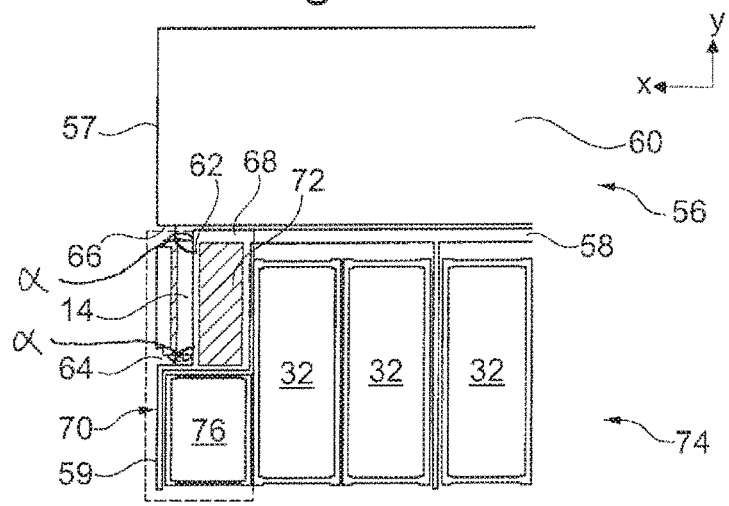

FIG. 4 discloses a further arrangement 56 with a first monument 58 and a second monument 60 arranged adjacent thereto, wherein a first wall 62 is located in a depression that is formed by a second wall 64, which is delimited by a third wall 59, and a further second wall 66, which is also delimited by a third wall 57. First wall 62 forms an angle α with each of the second walls 64 and 66. The two third walls 57 and 59 form a delimiting device for second walls 64 and 66. Second wall 64 is arranged in first cabin monument 58, whereas the additional second wall 66 is mounted on the adjacent monument 60. Finally, a folding seat 14 is shielded by two second walls 64 and 66 similarly to the situation shown in FIG. 3.

The first monument 58 may be part of a galley monument, wherein the first wall 62 limits at least a part of the storage space present in first cabin monument 58. It is a logical step to divide an area 68 into a storage space 70 for a half-size cabin trolley and a stowage compartment 72 accessible behind it. This stowage compartment 72 might be reachable for example from a front side 74 of first cabin monument 58, when any half-size cabin trolleys 76 have been pushed out of storage space 70. The other storage spaces may be configured to accommodate full-size cabin trolleys 32.

Figure 5:
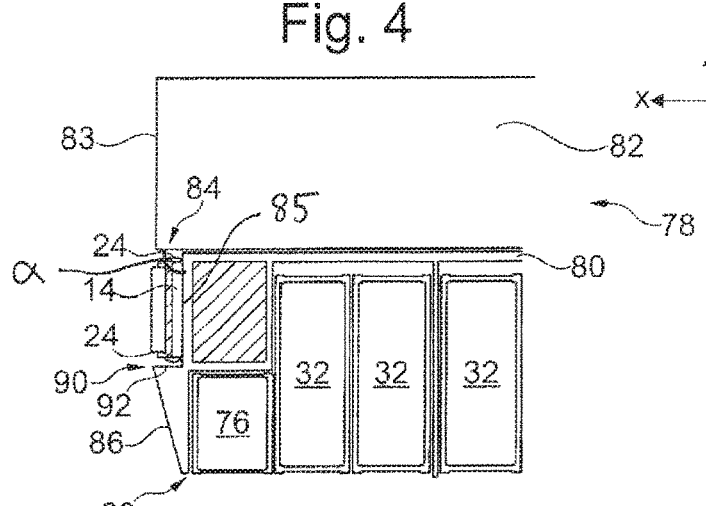

FIG. 5 shows an arrangement 78 that represents a slight variation of the arrangement 56 of FIG. 4. A first cabin monument 80, which is arranged adjacent to a second cabin monument 82, also forms an overlap. A second wall 84, which is delimited by a third wall 83 and extends outwardly from a first wall 85, forms a protective screen for a lateral surface 24 of a folding seat 14. Second wall 84 is arranged at an angle α to first wall 85. However, the other lateral surface 24 thereof is shielded by a deflector 86, which has the form of a shield extending diagonally from an outer delimiting edge 88 of first cabin monument 80 to a delimiting edge 90 of a second wall 92 farthest from first cabin monument 80. As a result, the first cabin monument and second cabin monument 82 are only arranged with an offset relative to each other and shielding of folding seat 40 is assured on both sides by using an additional deflector. This might be made from a material with low density, for example a honeycomb composite panel. It does not have to withstand high mechanical loads, merely performing the function of a deflector. Alternatively, instead of arranging a separate deflector 86 on a wall of first cabin monument 80 that is already present, this deflector 86 itself may form the wall of the first cabin monument 80. Third wall 83, whose axis of extension preferably also encloses delimiting edge 90, then serves as a delimiting device.

Figure 6:
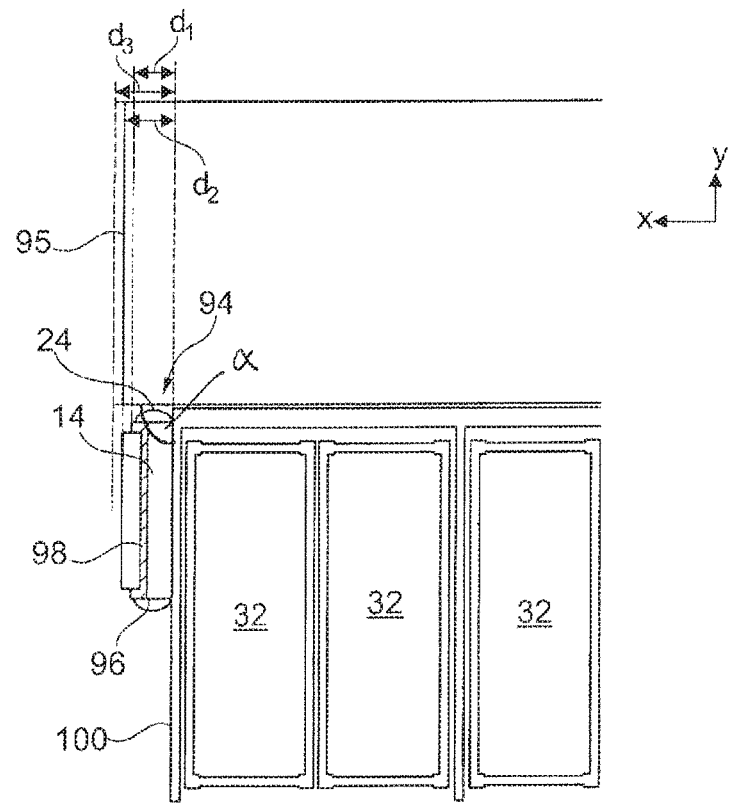

FIG. 6 shows which extensions of a second wall 94 as far as a third wall 95 along a lateral surface 24 of a folding seat 14 are possible and preferred. A folding seat 14 may have a base structure 96 to which soft seating parts 98 are attached. The second wall 94 preferably extends far enough over a first wall 100 at an angle α to the first wall 100 like the firm base structure 96, which corresponds to a dimension designated $d_1$. However, second wall 94 preferably extends of the entire installation depth in an unused position, which corresponds to the dimension designated $d_2$. In order to enhance the protection significantly, the second wall 94 may also extend over an additional distance, which is the difference between the two aforementioned distances, for example. The dimension that results therefrom corresponds to the dimension designated $d_3$.

Figure 7:
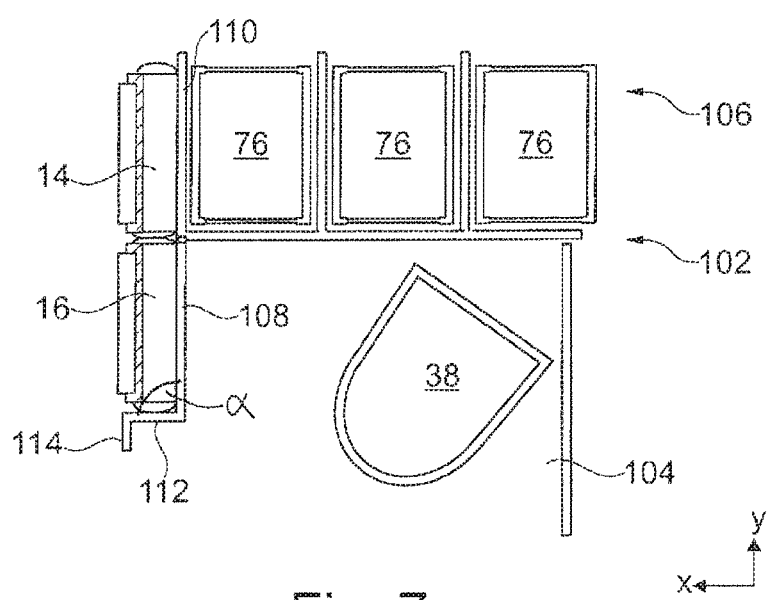

Finally, FIG. 7 illustrates a further arrangement 102, which consists of a first monument 104 in the form of a toilet and a second monument 106 in the form of a galley. Not only a first wall 108 of the first monument 104, but also a first wall 110 of the second monument 106 serve to accommodate folding seats 14 and 16, whereas only first monument 104 has a second wall 112, which is delimited outwardly by a third wall 114. The two monuments 104 and 106 may also form a larger monument and serve as modules for this. For exemplary purposes only, the second monument 106 has storage spaces for half-size cabin trolleys 76.

It should be noted in addition that "including" does not exclude any other elements or steps, and "one" does not preclude a plurality. It should further be noted that features which have been described with reference to one of the aforementioned embodiments can also be used in combination with other features of other embodiments that have also been described in the preceding text. Reference signs in the claims are not to be construed as a limitation thereof.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An arrangement in a cabin of a vehicle, comprising:
a first cabin monument having a first wall and a second wall extending from the first wall of the first cabin monument, the second wall of the first cabin monument arranged at an angle of at least 45° to the first wall of the first cabin monument;
at least one folding seat mounted on the first wall of the first cabin monument, the at least one folding seat having an installation width occupied by a back side of the at least one folding seat, and the at least one folding seat having an installation depth occupied by a lateral surface of a seat frame of the at least one folding seat;
a second cabin monument immediately adjacent to the first cabin monument, the second cabin monument having a second wall and a third wall, the second wall of the second cabin monument arranged at an angle of at least 45° to the first wall of the first cabin monument, and the third wall of the second cabin monument arranged as a delimiting element to delimit an extension of the second wall of the second cabin monument from the first wall of the first cabin monument; and
a deflector having a substantially flat outer component surface that extends diagonally from an outer delimiting edge of the second wall of the first cabin monument farthest from the first wall of the first cabin monument, to an outer delimiting edge of the first cabin monument farthest from the second cabin monument, the outer component surface of the deflector forming an angle less than 90° with the second wall of the first cabin monument;
wherein the second wall of the first cabin monument and the second wall of the second cabin monument extend from the first wall of the first cabin monument by at least the installation depth of the seat frame; and
wherein the first wall of the first cabin monument, the second wall of the first cabin monument, and the second wall of the second cabin monument form a depression for protecting the at least one folding seat such that lateral surfaces of the at least one folding seat are shielded by the second wall of the first cabin monument and the second wall of the second cabin monument.

2. The arrangement in a cabin of a vehicle of claim 1, wherein the first wall of the first cabin monument and the second wall of the first cabin monument are arranged perpendicularly to one another.

3. The arrangement in a cabin of a vehicle of claim 1, wherein the first wall of the first cabin monument and the second wall of the first cabin monument are formed by a recess in a housing wall of the first cabin monument.

4. The arrangement in a cabin of a vehicle of claim 1, wherein the third wall of the second cabin monument extends substantially parallel to the first wall of the first cabin monument.

5. The arrangement in a cabin of a vehicle of claim 1, wherein the second wall of the first cabin monument extends from the first wall of the first cabin monument by at least a total installation depth of the at least one folding seat in an unused folded position.

6. The arrangement in a cabin of a vehicle of claim 1, wherein two folding seats are arranged on the first wall of the first cabin monument.

7. The arrangement in a cabin of a vehicle of claim 1, wherein the first cabin monument has storage space for accommodating a trolley on a side of the first wall of the first cabin monument farthest from the at least one folding seat.

8. The arrangement in a cabin of a vehicle of claim 1, wherein the first cabin monument is a galley monument.

9. The arrangement in a cabin of a vehicle of claim 1, wherein the first cabin monument includes a toilet.

10. A vehicle comprising a cabin with a cabin arrangement, the cabin arrangement comprising:
a first cabin monument having a first wall and a second wall extending from the first wall of the first cabin monument, the second wall of the first cabin monument arranged at an angle of at least 45° to the first wall of the first cabin monument;
at least one folding seat mounted on the first wall of the first cabin monument, the at least one folding seat having an installation width occupied by a back side of the at least one folding seat, and the at least one folding seat having an installation depth occupied by a lateral surface of a seat frame of the at least one folding seat;
a second cabin monument immediately adjacent to the first cabin monument, the second cabin monument having a second wall and a third wall, the second wall of the second cabin monument arranged at an angle of at least 45° to the first wall of the first cabin monument, and the third wall of the second cabin monument arranged as a delimiting element to delimit an extension of the second wall of the second cabin monument from the first wall of the first cabin monument; and a deflector having a substantially flat outer component surface that extends diagonally from an outer delimiting edge of the second wall of the first cabin monument farthest from the first wall of the first cabin monument, to an outer delimiting edge of the first cabin monument farthest from the second cabin monument, the outer component surface of the deflector forming an angle less than 90° with the second wall of the first cabin monument;

wherein the second wall of the first cabin monument and the second wall of the second cabin monument extend from the first wall of the first cabin monument by at least the installation depth of the seat frame; and wherein the first wall of the first cabin monument, the second wall of the first cabin monument, and the second wall of the second cabin monument form a depression for protecting the at least one folding seat such that lateral surfaces of the at least one folding seat are shielded by the second wall of the first cabin monument and the second wall of the second cabin monument.

* * * * *